United States Patent
Jain et al.

(10) Patent No.: US 9,986,031 B2
(45) Date of Patent: May 29, 2018

(54) CONTAINER PROVISIONING BASED ON COMMUNICATIONS PATTERNS BETWEEN SOFTWARE COMPONENTS

(71) Applicant: International Business Machines Corporation, Armonk, NY (US)

(72) Inventors: Rakesh Jain, San Jose, CA (US); Min Li, San Jose, CA (US); Ramani R. Routray, San Jose, CA (US); Yang Song, San Jose, CA (US); Chung-Hao Tan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 169 days.

(21) Appl. No.: 14/705,074

(22) Filed: May 6, 2015

(65) Prior Publication Data

US 2016/0330277 A1 Nov. 10, 2016

(51) Int. Cl.
*G06F 15/16* (2006.01)
*H04L 29/08* (2006.01)
*H04L 12/24* (2006.01)

(52) U.S. Cl.
CPC ...... *H04L 67/1095* (2013.01); *H04L 41/5096* (2013.01)

(58) Field of Classification Search
CPC .................. H04L 67/1095; H04L 41/5096
See application file for complete search history.

(56) References Cited

U.S. PATENT DOCUMENTS

| | | | |
|---|---|---|---|
| 8,719,535 B1 | 5/2014 | Palsule et al. | |
| 2010/0250228 A1 | 9/2010 | Cohn et al. | |
| 2012/0017213 A1* | 1/2012 | Hunt | G06F 21/53 718/100 |
| 2014/0137125 A1* | 5/2014 | Hsu | G06F 9/4856 718/102 |

(Continued)

OTHER PUBLICATIONS

Authors Disclosed Anonymously, "Method of Utilizing Polymorphic Techniques in Creation of Single Virtual Machine Image to Instantiate Multiple Virtual Machine Instances Running Different Components of a Composite Application," IP.com No. 000195303; Apr. 28, 2010; pp. 1-2.

(Continued)

*Primary Examiner* — Viet D Vu
(74) *Attorney, Agent, or Firm* — Cantor Colburn LLP; Bryan W Butler (57) ABSTRACT

Embodiments relate to container migration and provisioning. An aspect includes receiving a request to migrate a composite application to a container-based environment. Another aspect includes determining a plurality of software components that make up the composite application. Another aspect includes determining communications patterns between the plurality of software components. Another aspect includes determining a containerization plan for the composite application based on the determined communications patterns. Another aspect includes creating a plurality of containers, and communications channels between the plurality of containers, for the software components of the composite application based on the containerization plan.

20 Claims, 8 Drawing Sheets

(56) References Cited

U.S. PATENT DOCUMENTS

2015/0150003 A1* 5/2015 Emelyanov ............ G06F 9/455
                                                      718/1
2015/0261549 A1   9/2015 Barnes et al.
2016/0217050 A1   7/2016 Grimm et al.

OTHER PUBLICATIONS

Hacker, et al., "Secure Live Migration of Parallel Applications Using Container-Based Virtual Machines," Int. J. Space-Based and Situated Computing, vol. 2, No. 1, 2012; pp. 45-57.

IBM, "Method of Creating a Componentized Architecture for Unifying Resource Sharing Scenarios in Cloud Computing Environment," IP.com No. 000193146; Feb. 11, 2010; pp. 1-14.

\* cited by examiner

CONTAINER PROVISIONING BASED ON COMMUNICATIONS PATTERNS BETWEEN SOFTWARE COMPONENTS

BACKGROUND

The present invention relates generally to virtualized computer environments, and more specifically, to container migration and provisioning.

Cloud computing makes extensive use of virtual machines (VMs), because VMs permit workloads to be isolated from one another and for the resource usage to be somewhat controlled. However, the extra levels of abstraction, including the hypervisor, involved in VM-based virtualization may reduce workload performance, which is passed on to customers as worse price/performance. Once a hypervisor has added overhead, no higher layer can remove it. Such overheads then become a pervasive tax on cloud workload performance. Container-based virtualization may simplify the deployment of virtualized applications as compared to VMs, while continuing to permit control of the resources allocated to different applications.

SUMMARY

Embodiments include a method, system, and computer program product for container migration and provisioning. An aspect includes receiving a request to migrate a composite application to a container-based environment. Another aspect includes determining a plurality of software components that make up the composite application. Another aspect includes determining communications patterns between the plurality of software components. Another aspect includes determining a containerization plan for the composite application based on the determined communications patterns. Another aspect includes creating a plurality of containers, and communications channels between the plurality of containers, for the software components of the composite application based on the containerization plan.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of container migration and provisioning are provided, with exemplary embodiments being discussed below in detail. Containers are used in operating-system (OS) level virtualization to pack applications and the dependencies into relatively small, isolated virtual environments. Container deployment is application-centric. Each container packs one or more applications, or application components, with a slim version of the OS files and libraries that are required for the application to operate. While new applications can be structured with containerization in mind, existing applications may also be migrated to containers. However, manually migrating an existing application from a VM-based environment to a container-based environment requires core knowledge of the application. A container may be built manually, in which case a user must decide what applications will be included in the one or more containers of the application. For example, the user can pack a database application with a mail server application on top of a base image of Ubuntu™ in a single container. However, container packaging decisions may be relatively complex for composite applications, for example, cluster-based software such as a MapReduce framework. Embodiments of container migration may automatically examine application components and create one or more appropriate containers for the application. Further, a container image repository may be updated and managed based on collected application data, and the images in the container image repository may be used for container provisioning.

In embodiments of container migration and provisioning, the analysis of an existing application maps out the different components of the application and their relationships, producing a descriptor, which may be an extensible markup language (XML) document in some embodiments, which describes the different components of the application, the relationships between those components (e.g., inter-component communication patterns), and the underlying infrastructure statistics (e.g., average pairwise ping delays or network topology) of the application. The application descriptor is then used to containerize the application. A containerization plan is generated based on the descriptor, and the containerization plan is executed by finding and/or creating container images for the application components, and wiring the containers together based on the component layout.

In order to provision a container corresponding to an application, a container image is needed. Embodiments of container migration and provisioning maintain a local, or private, container image repository, and may also communicate with one or more public container image repositories. The images in the local container repository are stored based on monitoring of application packaging patterns in the local environment, and used to provide customized container image recommendations. In some embodiments, application packaging patterns are also monitored across one or more other outside environments, and published in the public container image repository. The data from the public container image repository is also used to provide packaging recommendations for the local container image repository. For complex, or composite, applications, there will be multiple ways to pack the application components. For example, if the user requests a Hadoop service in a container format, all components, such as NameNode and DataNode, may be packed in a single container, or each component may be packaged in an individual container and communicate with each other via container networking. The user may be provided with one or more recommendations for packaging the application into one or more containers, and the user may select a packaging scheme for the application based on the recommendations.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
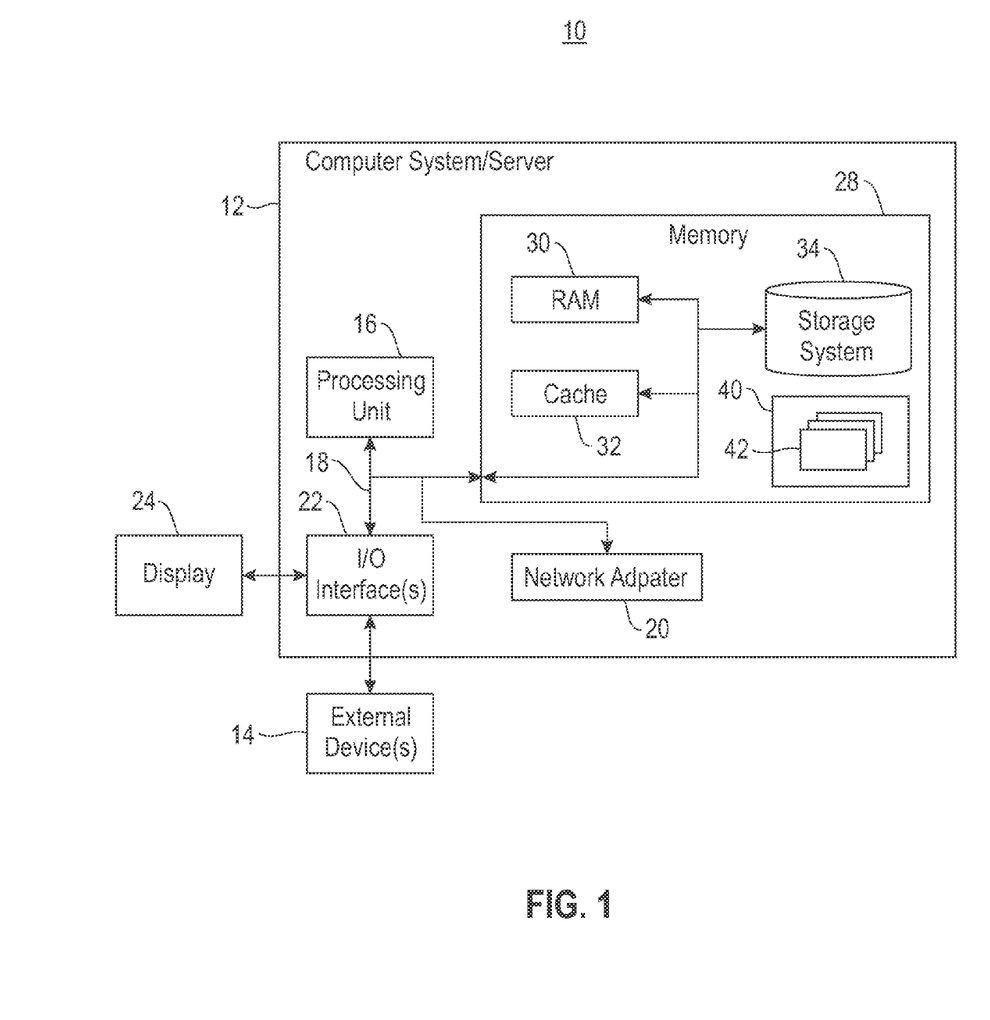
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
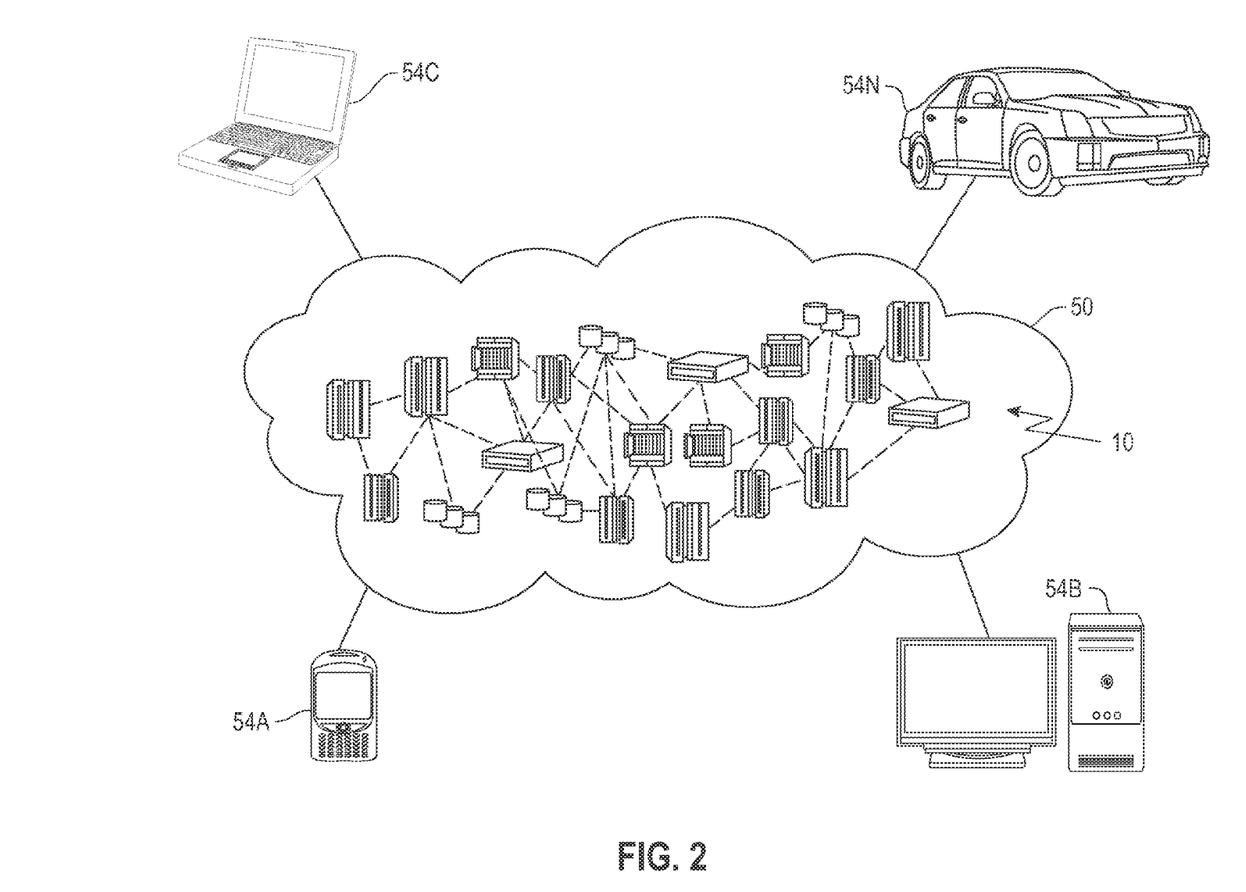
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
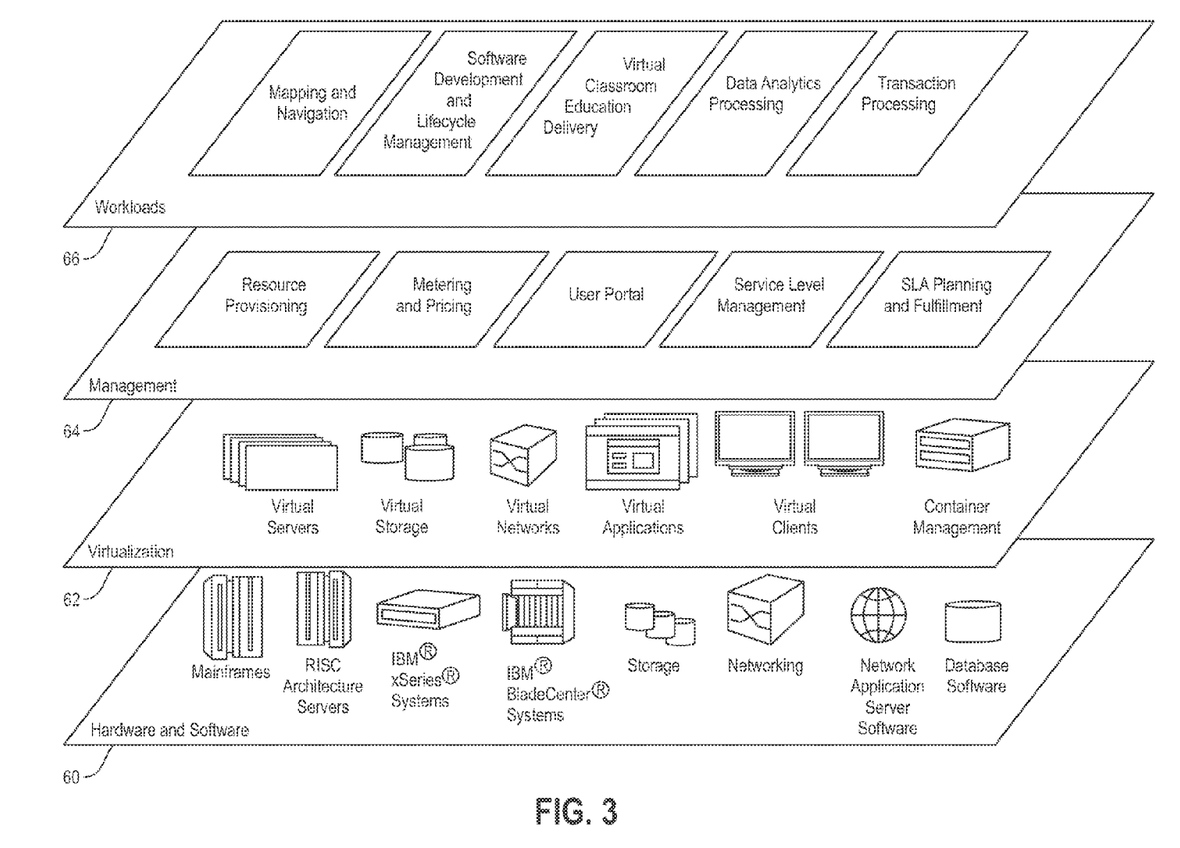
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients. Virtualization layer 62 also includes container management software, including container migration and provisioning in accordance with various embodiments that are discussed below.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 4:
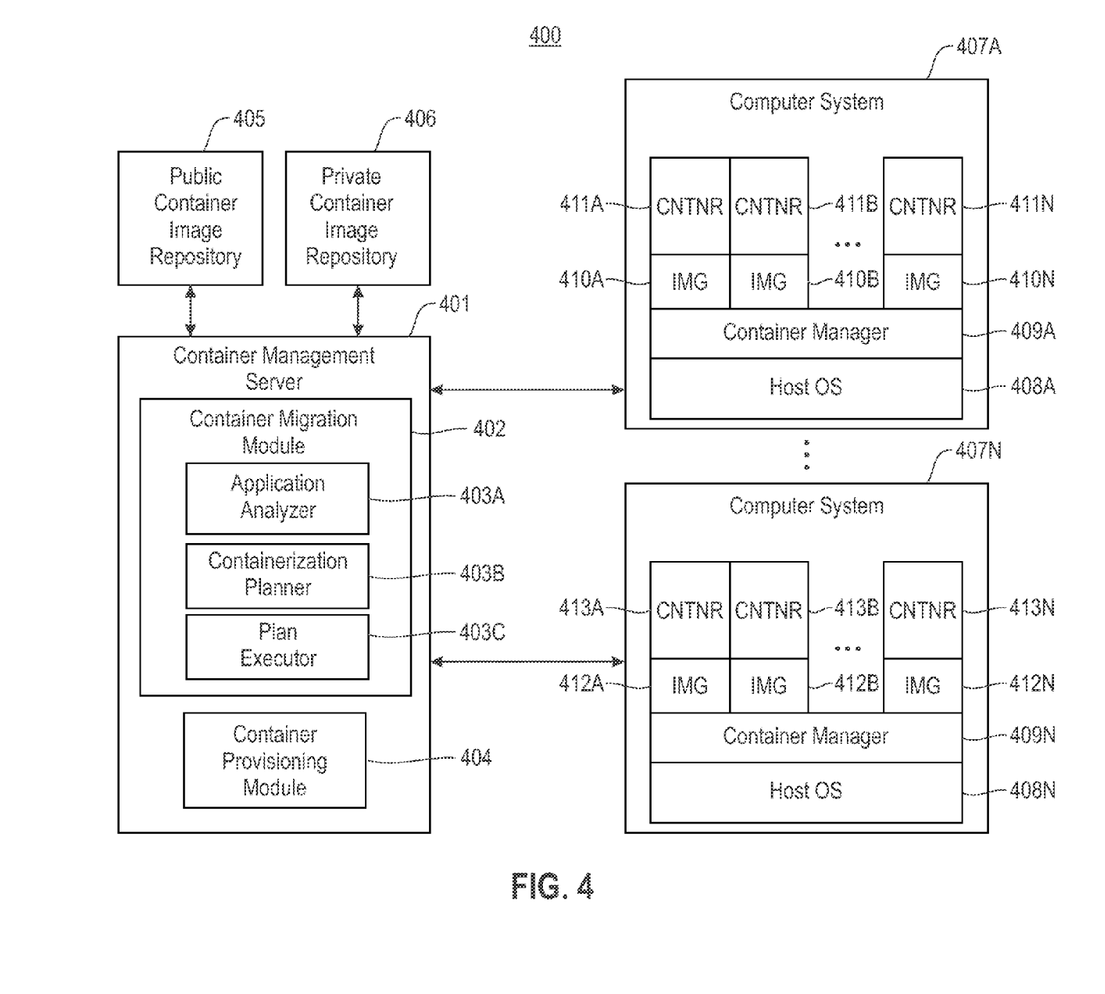
FIG. 4 depicts a system for container migration and provisioning in accordance with an embodiment.

FIG. 4 depicts an embodiment of a system 400 for container migration and provisioning. System 400 may comprise a data center that may be used for, for example, provisioning of cloud services, and includes a container management server 401 that is in communication with a plurality of computer systems 407A-N, which may also be referred to as nodes. The container management server 401 includes a container migration module 402, and a container provisioning module 404. The container migration module 402 includes an application analyzer 403A, and containerization planner 403B, and a plan executor 403C. The container management server is further in communication with a public, or global, container image repository 405, and a private container image repository 406. The computer systems 407A-B each host one or more containers, such as containers 411A-N and containers 4113A-N, that were provisioned by the container management server 401. Each computer system such as computer systems 407A-N includes a host operating system 408A-N and a container manager 409A-N that runs on top of the operating system 408A-N. The container manager 409A-N hosts a plurality of container images, such as images 410A-N and 412A-N, that each host one or more containers such as containers 411A-N and 413A-N. FIG. 4 is shown for illustrative purposes only; a system 400 may include any appropriate number of container management servers, computer systems, and container image repositories. Further, each of the computer system may host any appropriate number of containers in various embodiments. Further, the various elements of a system such as system 400, such as the container management server, computer systems, and container image repositories, may be interconnected and communicate in any appropriate manner. Further, in some embodiments, containers such as containers 411A-N and 413A-N may be provisioned in one or more nodes that comprise VMs. Further, any appropriate number of physical machines that are running any appropriate number of VMs and/or containers may be included in system 400.

In container migration module 402, application analyzer 403A may generate an application descriptor for an application to be migrated, and then containerization planner 403B may generate a list of containers with associated packaging strategies for the application, using the application descriptor and a set of predefined packaging policy, e.g., two or more containers should be merged into one container if their associated application components communicate frequently (e.g., a exceeding predefined threshold). In some embodiments, the application descriptor may be generated based on prior experience with the application being migrated, e.g., a best practice knowledge base, or application data may be provided by a user in, for example, an XML format. In various embodiments, the application descriptor may be generated based on any appropriate composite application monitoring and diagnosis tools. In some embodiments, user-provided infrastructure characteristics (e.g., machine ping statistics or layout) may be used to determine the container packaging strategy (e.g., if pairwise latency between nodes exceeds a predetermined threshold, a bin-packing strategy may be used to pack all components into a reduced number of containers, subject to resource constraints). Container migration module 402 is discussed in further detail below with respect to FIGS. 5-6.

Container provisioning module 404 may recommend application packaging strategies in a system 400 comprising a container-based virtualization service environment. The container provisioning module 404 may monitor and store data regarding most common application component packaging strategies for any appropriate types of applications across multiple environments. The container provisioning module 404 may also monitor and store data regarding communication patterns and latency between application components within the local data center. When a new application container is requested by a user, the container provisioning module may retrieve information regarding common application component packaging strategies for the application across multiple environments. In some embodiments, the user may be presented with various options for packaging the application, including a determined common packaging strategy and a default packaging strategy, and the user may select a preferred packaging strategy. A packaging strategy may be recommended to the user based on the stored communication pattern and latency data using predefined rules, e.g., pack components with relatively frequent communications and high latency (e.g., as compared to various thresholds) in single container. Rule-based application component traffic pattern best practices may also be consulted to estimate communication patterns and latency levels for an application. For example, for packaging of a Hadoop container, for file system access, NameNode will be a bottleneck and it thus would be beneficial to package DataNode and NameNode in a container together for relatively fast testing of input/output (I/O) intensive jobs. Other application-specific best practice rules may be applied in various embodiments. Container provisioning module 104 is discussed in further detail below with respect to FIGS. 7-8.

Figure 5:
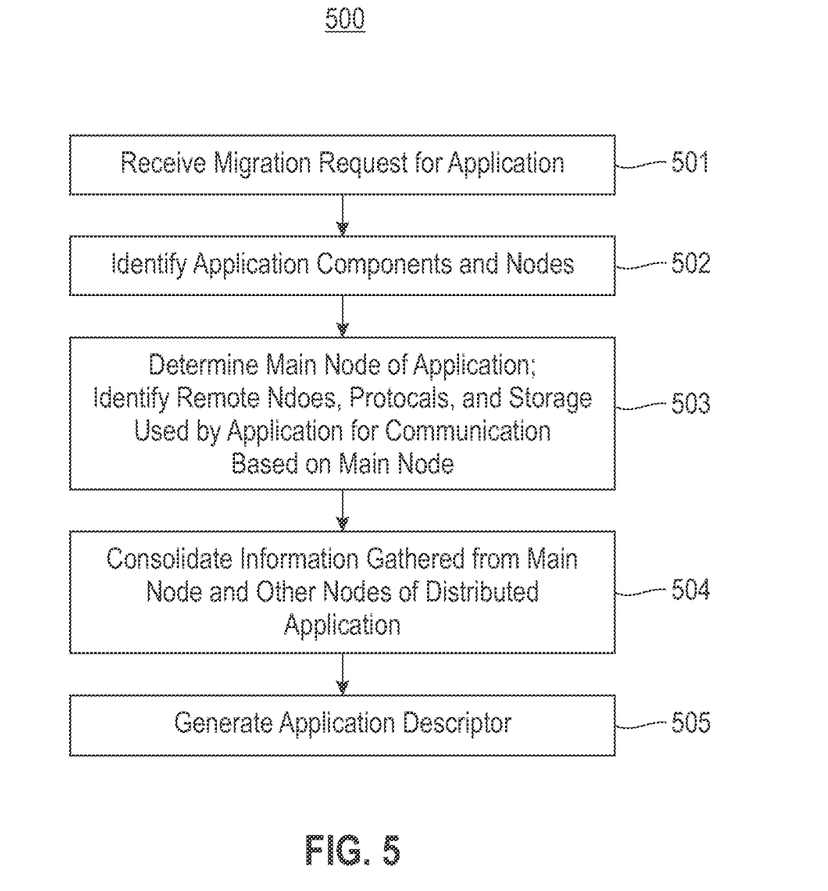
FIG. 5 depicts a process flow for generation of an application topology for container migration in accordance with an embodiment.

FIG. 5 depicts an embodiment of a method 500 for generation of an application topology for container migration in accordance with an embodiment. Method 500 may be implemented in application analyzer 403A in container migration module 402 in in container management server 401 of FIG. 4. In block 501, the container migration module 402 receives a request to migrate a distributed application from, for example, a VM-based environment to a container-based environment. Next, in block 502, the application analyzer 403A identifies the components of the application, and the particular nodes (e.g., computer systems in the data center such as system 400) upon which the various components are running. Some embodiments of applications may be single-node based applications, while other embodiments of applications may be more complex, distributed applications spanning multiple nodes of the data center. The application analyzer 403A determines all nodes in the system 400 that are involved in the application, i.e., where any component of the application is running. Examples of component software of a single distributed application that may be distributed among various nodes include International Business Machines™ (IBM) Websphere™ on a main node, IBM hypertext transfer protocol (HTTP) Server™ on a remote host, IBM Websphere Message Queue (WMQ)™ on another host, and database2 (DB2)™ on yet another host. Some further examples of application components that may be identified by the application analysis are operating systems such as Linux™, and Apache Web Server™, My structured query language (MySQL), and/or PHP Hypertext Processor (PHP). In various embodiments of block 502 of method 500, the nodes may be physical machines and/or VMs.

In block 503, the main node of the application is determined, and remote network endpoints and protocols used to communicate by the application are identified based on the main node. The main application components may be identified by examining the processes of the application by application analyzer 403A. A main node where a core part of the application is running is also identified. For example, a Hadoop cluster will have its NameNode as main node, while a simple three tier web based application will have its application hosting middleware server node as the main component. The main node may be a physical machine or a VM in various embodiments. Once the main node is identified, the core framework hosting the application on main node is identified, and configuration file(s) on the main node may be inspected determine communication network and protocol information for the application. The internet protocol (IP) address of each of the nodes hosting a component of the distributed application is also identified, as well as the communications protocols used to communicate between components. The storage used by each individual component of the application is also identified in block 503. Various composite application monitoring and diagnosis tools, such as IBM Tivoli Monitoring™ or IBM Tivoli Composite Application Monitor (ITCAM)™, may be used in blocks 502 and 503 to determine the components of a composite application, and monitor internal calls within the application to estimate the communication patterns among application components. Both static analysis and dynamic analysis of the application environment is performed to determine how to migrate the application to a container-based environment.

In block 504, the information gathered in blocks 502 and 503 is consolidated by application analyzer 403A, with nodes and the particular software on each node corresponding to the application being identified, along with software configuration. In block 505, the application analyzer 403A generates a descriptor the application topology of the distributed application based on the consolidated information of block 504. The application topology descriptor may be an XML document in some embodiments. The nodes that are listed in the descriptor may be physical machines and/or VMs in various embodiments.

Figure 6:
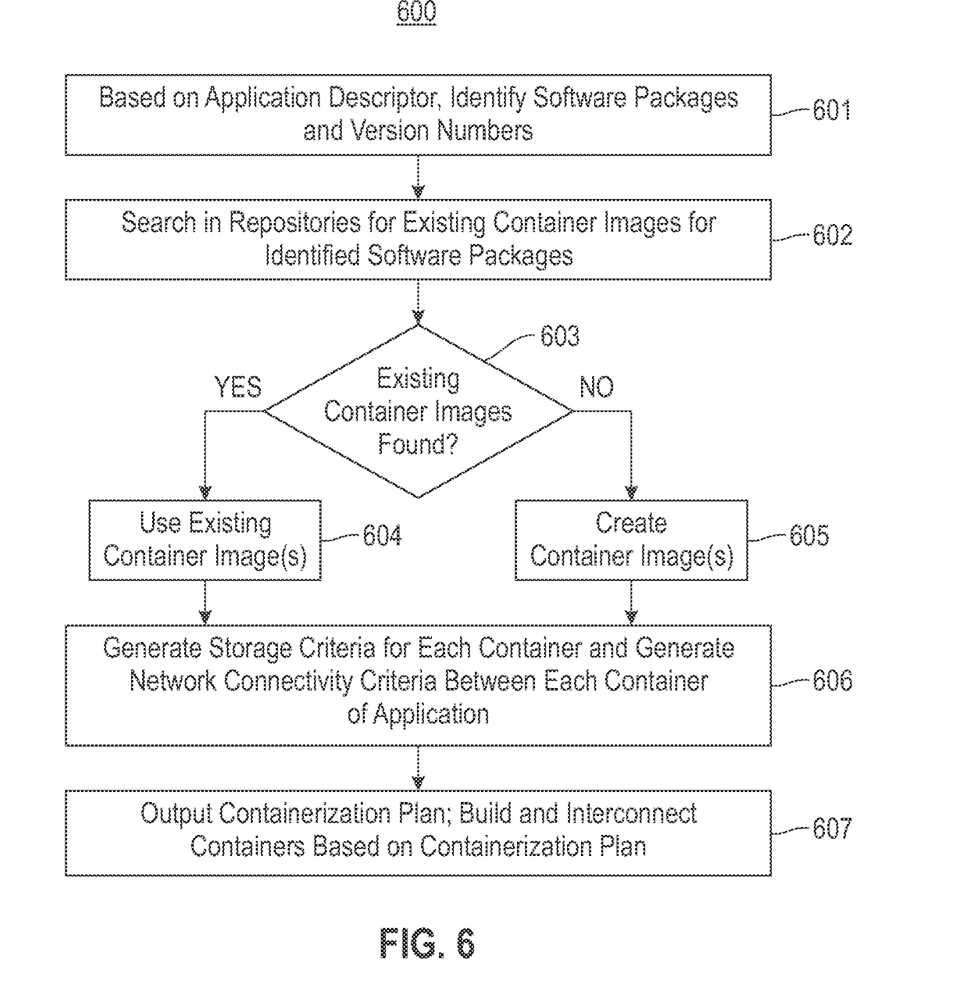
FIG. 6 depicts a process flow for container migration based on the application topology in accordance with an embodiment.

FIG. 6 depicts an embodiment of a method 600 for container migration based on the application topology. Method 600 may be implemented in containerization planner 403B and plan executor 403C in container migration module 402 in in container management server 401 of FIG. 1. First, in block 601, software packages, including version numbers, of the various components of the distributed application are identified based on the application descriptor that was generated by method 500 of FIG. 5. Next, in block 602, container image repositories, such as the public container image repository 405 and the private container image repository 406 of FIG. 4, are searched for existing container images for the identified software packages. It is determined in block 603 whether an existing image was found in block 602. If it is determined in block 603 that an existing container image was found, flow proceeds from block 603 to block 604, in which the existing container image that was found in the repository is used. If it is determined in block 603 that no existing image was found, flow proceeds from block 603 to block 605, in which the containerization planner 403B generates a new container image for the distributed application. Both of blocks 604 and 605 may be executed for a multi-container application. Flow proceeds from both of blocks 604 and 605 to block 606. In block 606, storage criteria are generated for each container of the application, and network connectivity criteria are generated for inter-container communications by the application. Lastly, in block 607, the containerization plan, including the container images and storage and network connectivity criteria, is output by the containerization planner 403B to the plan executor 403C, and the plan executor 403C builds and interconnects the containers for the distributed application based on the containerization plan. In some embodiments, the containerization planner 403B may merge two or more containers of the application into a single container in the containerization plan if the two or more containers communicate frequently (e.g., exceeding a predefined threshold). Various other infrastructure characteristics (e.g., machine ping statistics or layout) may be used to determine the containerization plan (e.g., if pairwise latency between nodes exceeding a predetermined threshold, use a bin-packing strategy to pack all components of the application into a reduced number of containers, subject to resource constraints). The containers are deployed on underlying infrastructure of the system 400, and network connections among the containers are configured. Various predefined rules may be used to determine the container packaging configuration in block 607, e.g., if components A and B communicate with each other more than 10 times within one minute (on average) and the delay exceeds 50 milliseconds, A and B should be packaged in a single container. Otherwise, separate containers may be used for components A and B to protect modularity and reusability.

Figure 7:
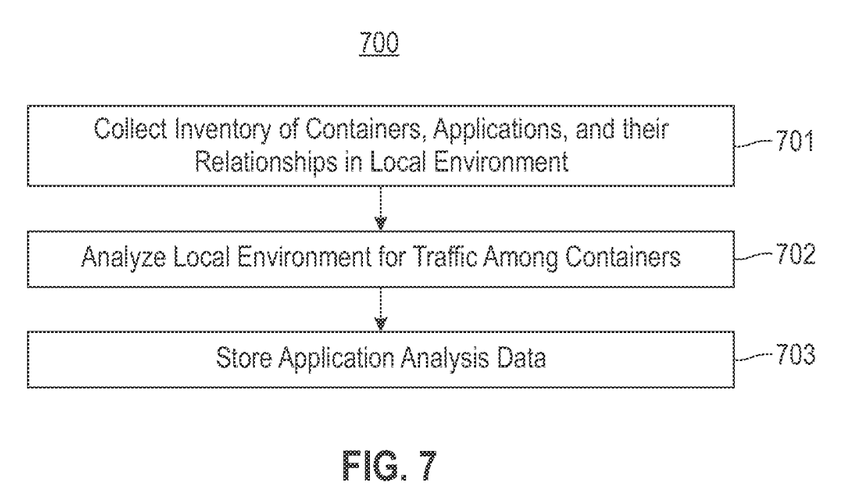
FIG. 7 depicts a process flow for collection of application analysis data for container provisioning in accordance with an embodiment.

FIG. 7 depicts an embodiment of a method 700 for collection of application analysis data for container provisioning. Method 700 may be implemented in container provisioning module 404 in container management server 401 of FIG. 4. First, in block 701, the system 400 is monitored, and an inventory of the various containers, such as containers 411A-N and containers 413A-N, are collected. Then, in block 702, the collected data is analyzed to determine communications traffic patterns among the containers. For example, if a user already has a Hadoop service running in the system 400, the traffic characteristics such as delay and jitter among the various components of the Hadoop service are analyzed. Lastly, in block 703, the analyzed data is stored in, for example, the container management server 401.

Figure 8:
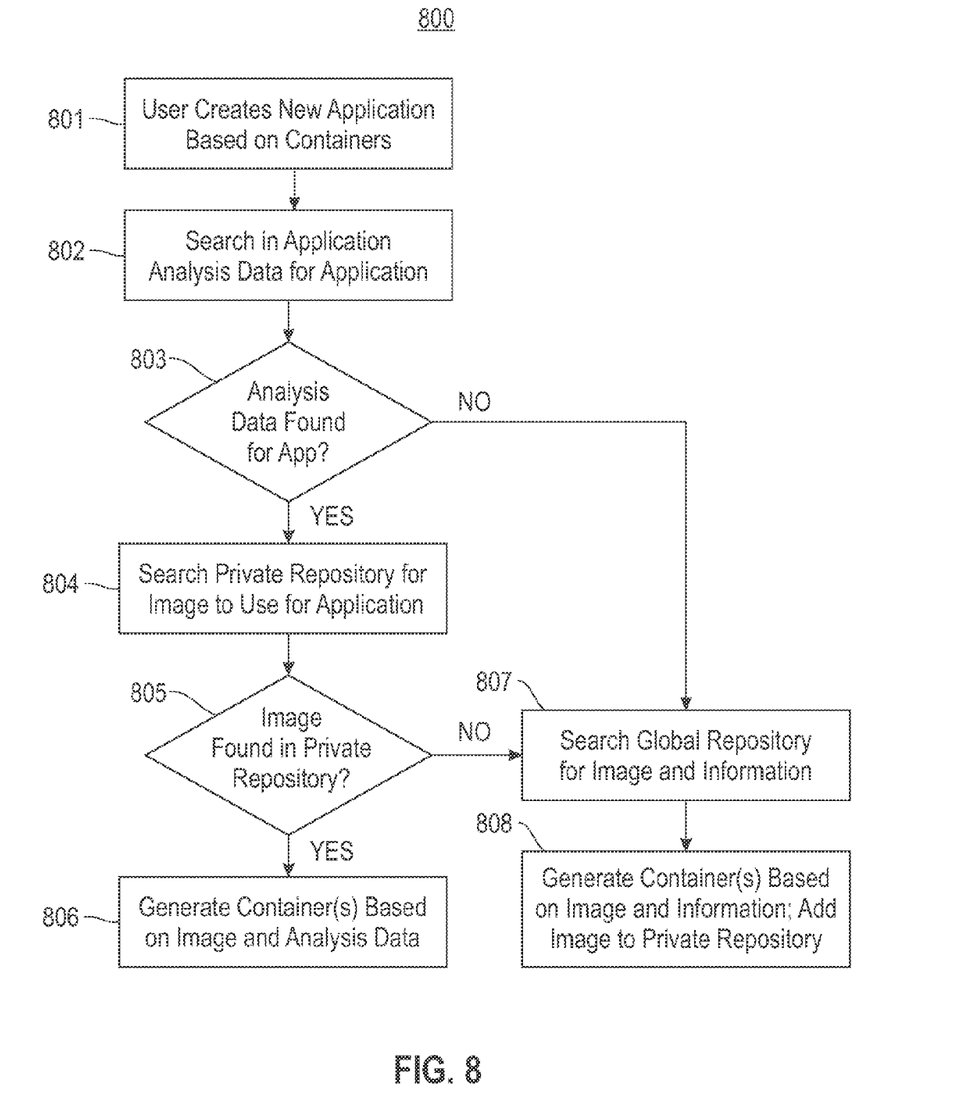
FIG. 8 depicts a process flow for container provisioning in accordance with an embodiment.

FIG. 8 an embodiment of a method 800 for container provisioning in accordance with an embodiment. Method 800 may be implemented in container provisioning module 404 in container management server 401 of FIG. 4. In block 801, a user creates a new application based on containers. Next, in block 802, the application analysis data that was stored in block 703 of FIG. 7 is searched for analysis data corresponding to the application. In block 803, it is determined whether analysis data was found for the application in block 802. If analysis data for the application was not found in block 802, then flow proceeds from block 803 to block 807, which is discussed below. If analysis data for the application was found in block 502, then flow proceeds from block 803 to block 804, in which the private container image repository 406 is searched for an image corresponding to the application. In block 805, if it is determined that an image corresponding to the application was found in the private container image repository in block 804, flow proceeds from block 805 to block 806. In block 806, containers for the application are generated based on the analysis data that was found in block 803 and the image that was found in block 804.

If it was determined in block 805 that an image corresponding to the application was not found in the private container image repository 406, and flow proceeds from block 805 to block 807. In block 807, the public container image repository 405 is searched for a container image corresponding to the application. Rule-based application component traffic pattern best practices may also be retrieved for the application in block 807. Then, in block 808, the container image that was found in block 807 in the public container image repository 405, along with any analysis data or best practices that were found corresponding to the application, is used to generate the one or more containers for the application. Also, the image from the public container image repository 405 is added to the private container image repository 406 in block 807. In some embodiments, multiple options for containerizing the application are presented to a user in block 808, the user may select a preferred option, and the one or more container(s) for the application are generated based on the selected option.

In an example of a search of a public container image repository 405, as is performed in block 807, population-level container building statistics may be queried and then predefined rules (based on, for example, communication patterns and network latencies) may be used to generate recommendations for specific local container building. For example, the container provisioning module 404 may query the public container image repository 405 in block 807 about the most common ways that the specific application has historically been packaged, e.g., the public container image repository 105 may indicate that more than 80% of the Hadoop related containers were built with all NameNode and DataNodes in separate containers. The container provisioning module 104 can provide this information to the user in block 808, and let user to choose whether to use the popular packaging solution or a default solution, which may be to pack everything in a single container. The one or more containers for the application are then generated based on the option that was selected by the user. The one or more containers may be provisioned on one or more nodes, and the nodes may comprise physical machines and/or VMs in various embodiments.

Technical effects and benefits include automated migration of applications to container-based environments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for container migration and provisioning, the method comprising:
   receiving, by a container migration module of a container management server, a request to migrate a composite application to a container-based environment;
   determining, by an application analyzer of the container migration module, a plurality of software components that make up the composite application;
   determining, by the application analyzer, communications patterns between the plurality of software components;
   determining, by a containerization planner of the container migration module, a containerization plan for the composite application based on the determined communications patterns including a communication frequency and a communication latency between the plurality of software components; and
   creating, by a plan executor of the container migration module, a plurality of containers, and communications channels between the plurality of containers, for the software components of the composite application based on the containerization plan.

2. The method of claim 1, wherein the plurality of software components and the communications patterns between the plurality of software components are determined based on at least one of a best practice knowledge base, a user-provided descriptor, and an automated application monitoring tool.

3. The method of claim 1, wherein the containerization plan is further generated based on one or more infrastructure characteristics of a data center in which the container management server is located.

4. The method of claim 3, wherein the one or more infrastructure characteristics includes ping times between computer systems of the data center, and wherein, based on a ping time being greater than a threshold, two or more of the software components are merged into a single container.

5. The method of claim 1, further comprising, based on receiving a request for a new application container:
   monitoring containerization schemes in a data center by a container provisioning module of the container management server; and
   storing containerization data collected by the monitoring in a private container image repository of the data center.

6. The method of claim 5, further comprising, based on receiving a request to generate a new container, determining a containerization scheme for the new container based on the stored containerization data by the container provisioning module.

7. The method of claim 6, further comprising accessing additional containerization data stored in a global container image repository in order to determine the containerization scheme for the new container, wherein the additional containerization data comprises data regarding containerization schemes across a plurality of data centers.

8. The method of claim 5, wherein the containerization data comprises communications patterns and latency between application components in the data center.

9. A computer program product for implementing container migration and provisioning, the computer program product comprising:
   a computer readable storage medium having program instructions embodied therewith, the program instructions readable by a processing circuit to cause the processing circuit to perform a method comprising:
   receiving a request to migrate a composite application to a container-based environment;
   determining a plurality of software components that make up the composite application;
   determining communications patterns between the plurality of software components;

determining a containerization plan for the composite application based on the determined communications patterns including a communication frequency and a communication latency between the plurality of software components; and creating a plurality of containers, and communications channels between the plurality of containers, for the software components of the composite application based on the containerization plan.

10. The computer program product of claim 9, wherein the plurality of software components and the communications patterns between the plurality of software components are determined based on at least one of a best practice knowledge base, a user-provided descriptor, and an automated application monitoring tool.

11. The computer program product of claim 9, wherein the containerization plan is further generated based on one or more infrastructure characteristics of a data center in which the container management server is located.

12. The computer program product of claim 11, wherein the one or more infrastructure characteristics includes ping times between computer systems of the data center, and wherein, based on a ping time being greater than a threshold, two or more of the software components are merged into a single container.

13. The computer program product of claim 9, further comprising, based on receiving a request for a new application container:
  monitoring containerization schemes in a data center; and
  storing containerization data collected by the monitoring in a private container image repository of the data center.

14. The computer program product of claim 13, further comprising, based on receiving a request to generate a new container, determining a containerization scheme for the new container based on the stored containerization data.

15. The computer program product of claim 14, further comprising accessing additional containerization data stored in a global container image repository in order to determine the containerization scheme for the new container, wherein the additional containerization data comprises data regarding containerization schemes across a plurality of data centers.

16. A computer system for container migration and provisioning, the system comprising:
  a memory; and
  a processor, communicatively coupled to said memory, the computer system configured to perform a method comprising:
  receiving a request to migrate a composite application to a container-based environment;
  determining a plurality of software components that make up the composite application;
  determining communications patterns between the plurality of software components;
  determining a containerization plan for the composite application based on the determined communications patterns including a communication frequency and a communication latency between the plurality of software components; and
  creating a plurality of containers, and communications channels between the plurality of containers, for the software components of the composite application based on the containerization plan.

17. The system of claim 16, wherein the plurality of software components and the communications patterns between the plurality of software components are determined based on at least one of a best practice knowledge base, a user-provided descriptor, and an automated application monitoring tool.

18. The system of claim 16, wherein the containerization plan is further generated based on one or more infrastructure characteristics of a data center in which the container management server is located.

19. The system of claim 18, wherein the one or more infrastructure characteristics includes ping times between computer systems of the data center, and wherein, based on a ping time being greater than a threshold, two or more of the software components are merged into a single container.

20. The system of claim 16, further comprising, based on receiving a request for a new application container:
  monitoring containerization schemes in a data center; and
  storing containerization data collected by the monitoring in a private container image repository of the data center.

* * * * *